United States Patent [19]
Shin et al.

[11] 3,756,687
[45] Sept. 4, 1973

[54] DUAL GYRO MECHANICALLY COUPLED IMAGE MOTION COMPENSATOR HAVING NON-LINEAR DAMPING MEANS

[75] Inventors: Ihsuk Shin, Berwyn; John R. Richards, Dresher, both of Pa.

[73] Assignee: Dynasciences Corporation, Blue Bell, Pa.

[22] Filed: Sept. 23, 1971

[21] Appl. No.: 183,030

[52] U.S. Cl. .................................. 350/16, 350/286
[51] Int. Cl. ............................................ G02b 23/00
[58] Field of Search ........................................ 350/16

[56] References Cited
UNITED STATES PATENTS

| | | | |
|---|---|---|---|
| 3,503,663 | 3/1970 | Cierva et al. | 350/16 |
| 3,591,250 | 7/1971 | Feinstein et al. | 350/16 |
| 2,829,557 | 4/1958 | Jensen | 350/16 |

FOREIGN PATENTS OR APPLICATIONS

| | | | |
|---|---|---|---|
| 994,820 | 8/1951 | France | 350/16 |

*Primary Examiner*—John K. Corbin
*Attorney*—Stanley Bilker

[57] ABSTRACT

An image motion compensator for optical systems employs a variable-angle fluid medium encapsulated between spaced transparent elements pivotally disposed about mutually perpendicular axes. A pair of gyros whose axes are orthagonal to each other are mechanically coupled to the respective transparent elements to avoid cross coupling of image motion. Damping is non-linear — minimal about the center of precession and increasing exponentially with increase of precession angle. Restoring torque is applied magnetically to precession axis by means of opposed permanent magnets.

7 Claims, 5 Drawing Figures

INVENTORS
IHSUK SHIN
JOHN R. RICHARDS
BY
*Harley Bilker*
ATTORNEY

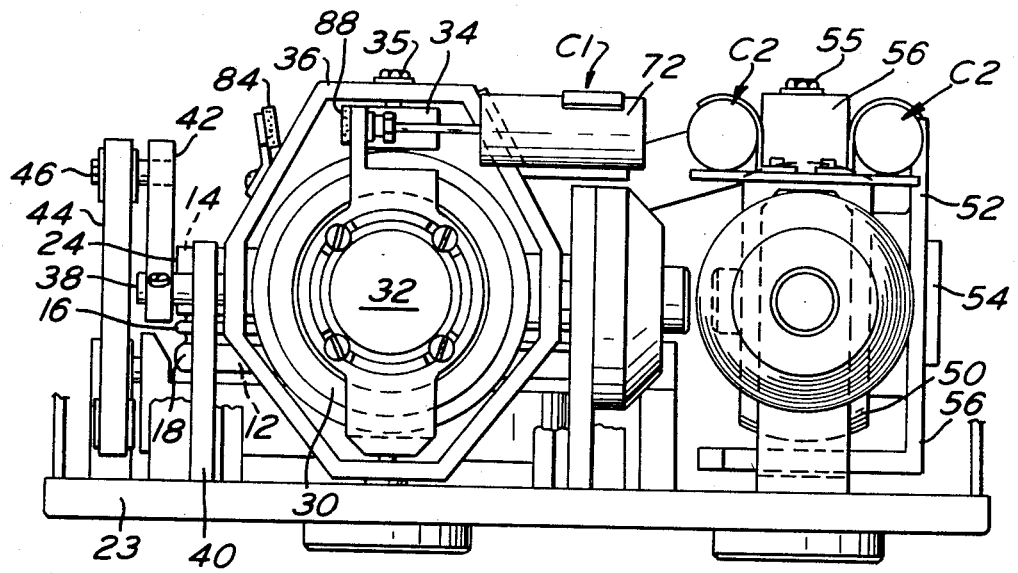
FIG. 2
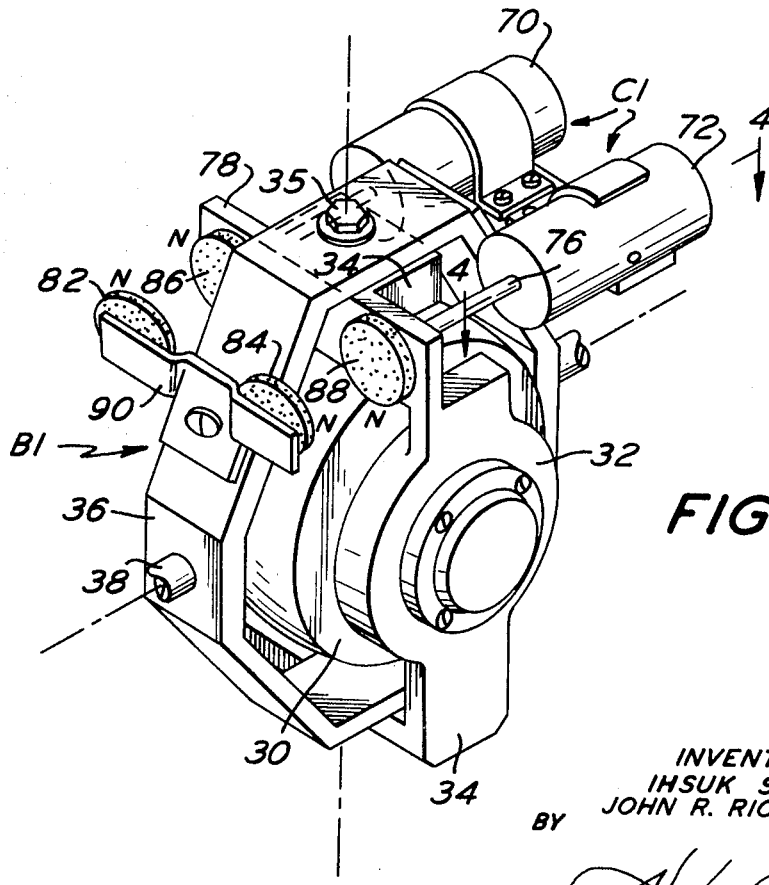
FIG. 3
INVENTORS
IHSUK SHIN
JOHN R. RICHARDS
BY 
ATTORNEY

DUAL GYRO MECHANICALLY COUPLED IMAGE MOTION COMPENSATOR HAVING NON-LINEAR DAMPING MEANS

This invention relates to an image motion compensator for camera and optical sighting systems, and more particularly relates to a variable-angle, fluid prism for deviating a light beam in response to angular motion in order to stabilize and nullify the effects of external vibrations and motion upon the image of such optical systems. The present invention is especially useful in connection with high powered telescopes, cameras, navigational and fire control devices which are mounted in aircraft, land vehicles or spacecraft, and/or when such optical devices are held in one's hand.

In prior U.S. Pat. No. 3,212,420, there is shown and described an image motion compensator in which a variable-angle fluid-filled prism is controlled by a rate gyro that is electronically coupled thereto by way of a closed loop servo system. That is, the gyro sensed the angular motion to which the optical system was subjected, and through an electronic amplifier and feedback transducer oriented the angular disposition of a pair of plates with respect to each other so that the liquid refracting medium encapsulated therebetween was formed into a wedge whose apex was transverse to the resultant motion. The relatively complex electronic circuitry and feedback system, however, although extremely efficient was inherently expensive to produce.

In prior U.S. Pat. No. 3,503,663, there is illustrated an image stabilizer comprising a variable-angle fluid wedge enclosed between transparent plates which were mechanically coupled and actuated by a single gyroscopic mass spinning on an axis substantially coincident with the axis of collimation of the optical system. That is, the gyro mass was by way of its gimbals linked mechanically along mutually perpendicular axes to the transparent plates, and damping means rotatable with the gyro mass permitted low frequency scanning motion but angularly displaced the spin axis with respect to the optical system in response to high frequency angular motion. Although the latter mechanically-coupled fluid prism design was considerably less expensive than its electronically controlled counterpart, the relatively bulky spinning mass tended to result in cross-coupling of image motion due to gyro precession.

It is therefore an object of this invention to provide a gyroscopically-controlled image motion compensator in which the transparent plates of a variable-angle fluid wedge are mechanically coupled to the gyro mass without producing cross-coupling of image motion due to gyro precession.

Another object of this invention is to provide a relatively inexpensive variable-angle fluid wedge system for compensation of image motion.

Still another object of this invention is to provide a variable-geometry image motion compensator in which high frequency stabilization is achieved while permitting low frequency panning or scanning.

Yet still another object of this invention is to provide a gyroscopically-controlled, variable-angle fluid prism in which damping and restoring torque are minimal about the center of precession and increase exponentially with increase in precession angle.

A still further object of this invention is to provide a gyroscopically-controlled, variable-angle fluid prism in which damping and restoring torques are minimally affected by temperature variations.

Other objects of this invention are to provide an improved device of the character described that is easily and economically produced, which is sturdy in construction, and both highly efficient and effective in operation.

With the above and related objects in view, this invention consists of the details of construction and combination of parts as will be more fully understood from the following detailed description when read in conjunction with the accompanying drawings in which:

FIG. 2 is an end view taken along lines 2—2 of FIG. 1.

FIG. 3 is a perspective view of the non-linear damped gyro system and magnetic torque restoration of precession embodied in this invention.

Figure 1:
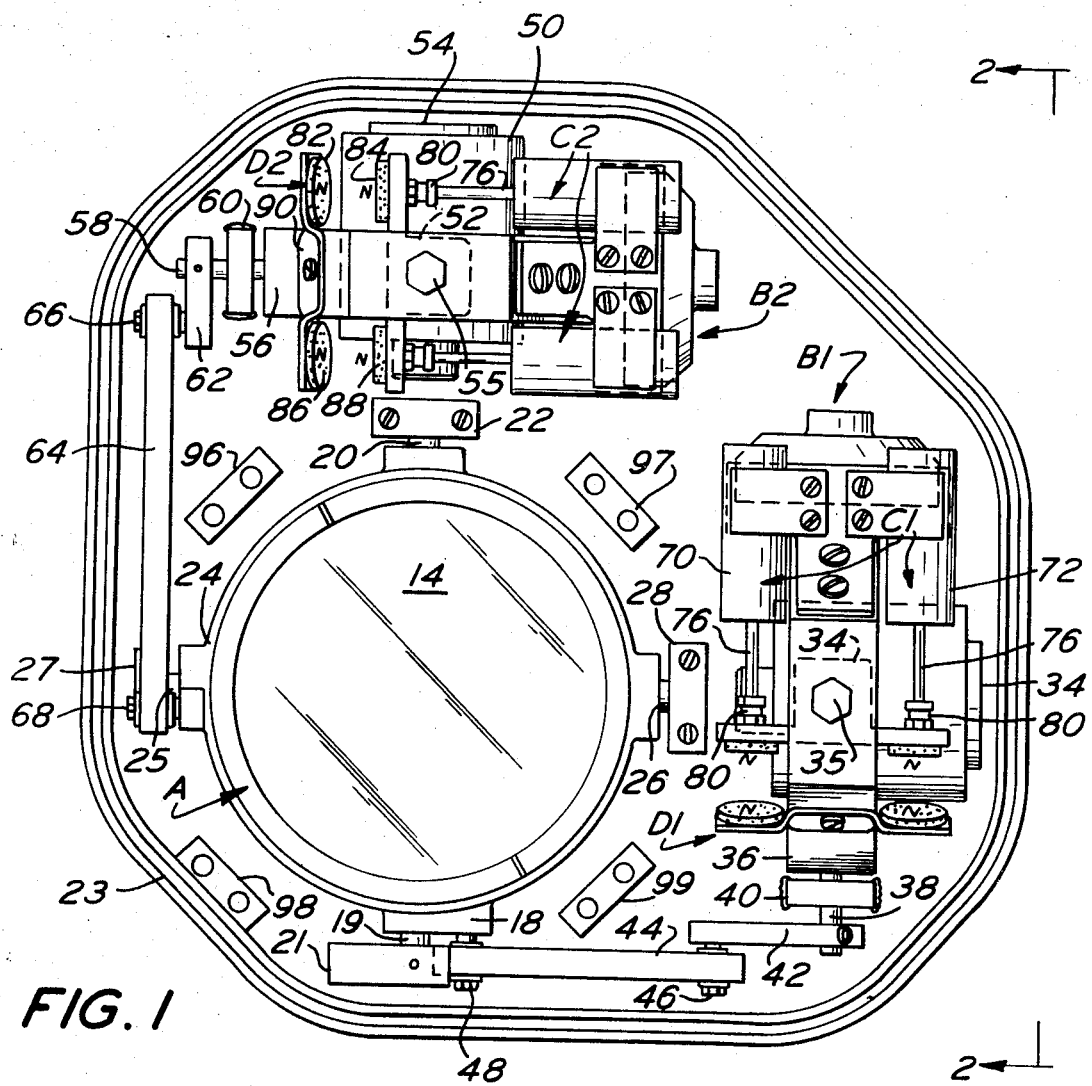
FIG. 1 is a top plan view of an image motion compensator with a variable-angle fluid prism and having a non-linear damped gyro coupling with magnetic restoring torque embodying this invention.

Referring now in greater detail to the drawings in which similar reference characters refer to similar parts, we show an image motion compensator for an optical system comprising a variable angle fluid prism, generally designated as A, and a pair of gyros B1 and B2 which are mechanically coupled respectively to a pair of pivotally supported transparent elements of the fluid prism. Non-linear damping means C1 are included with respect to the inner gimbal or precessional axis of gyro B1, and non-linear dampers C2 are incorporated in the precessional axis of gyro B2. Magnetic restoring torque means D1 and D2 are applied to the precessional axes of gyros B1 and B2 respectively whereby both the damping and restoring torques increase exponentially as the precessional angle of the respective gyros increase.

The variable angle fluid prism A comprises a pair of transparent plates 12 and 14 which are pivotally supported along mutually perpendicular axes. A transparent liquid medium (not shown) of suitable index of refraction is encapsulated between the plates by a bellows 16. A full description of the mechanism of the fluid prism is set forth in detail in U.S. Pat. No. 3,212,420 or U.S. Pat. No. 3,503,663. Transparent plate 12 is held in a retainer ring 18 which includes outwardly projecting trunnions 19 and 20 suitably journaled in opposing pillow blocks 21 and 22 that upstand from frame 23. Of course, a pair of opposing conical points (not shown) could equally as well engage opposed jeweled bearings in the ring 18 by projecting inwardly from the blocks 21 and 22. Similarly, transparent plate 14 is retained in a ring 24 which includes opposed trunnions 25 and 26 pivotally supported in journals 27 and 28 mounted on frame 23.

Gyro B1 includes a gyro mass 30 which is spun at relatively high speed by a motor 32. The motor leads are not shown, but they could readily supply power from a battery source which might be incorporated in a replaceable cassette pack. The spin axis of the mass 30 is conventionally supported in an inner gimbal 34 whose axis 35 is retained rotatably in an outer gimbal 36. The spin axis is perpendicular to the axis 19–20 of the transparent element 12. The outer gimbal axis constitutes a pair of outwardly extending trunnions 38 which are supported in jounals 40 upstanding from the frame 23. Actuator arm 42 is affixed to the end of trunnion 38 and is articulated with the lower plate indexing finger 44 by way of pin 46. The end of indexing finger 44 is coupled to the lower plate 12 by means of pin 48 eccentrically disposed with respect to trunnion 19. Thus, rotation of outer gimbal 36 with respect to frame 23 effects proportional pivoting of plate 12 to form the inner fluid medium into a wedge.

Gyro B2 is identical to gyro B1 except that the spin axis of its rotating mass 50 is oriented normal to the pivotal axis 25-26 of the upper transparent plate element 14. Inner gimbal 52 has its precession axis 55 supported within outer gimbal 56, the mass 50 being driven by motor 54. The outer gimbal 56 has a pair of outwardly extending trunnions 58 journaled in pillow blocks 60 upstanding from frame 23. An actuator arm 62 rotatable with trunnion 58 is articulated with indexing finger 64 for upper plate 14 by means of pivot pin 66. Indexing finger 64 is coupled to the ring 24 of upper transparent plate 14 by pin 68 which is located eccentrically with respect to trunnion 25. Thus, rotation of the outer gimbal 56 with respect to its pillow block 60 will cause proportional pivoting of upper plate 14 to induce wedge formation of the inner fluid element.

Figure 4:
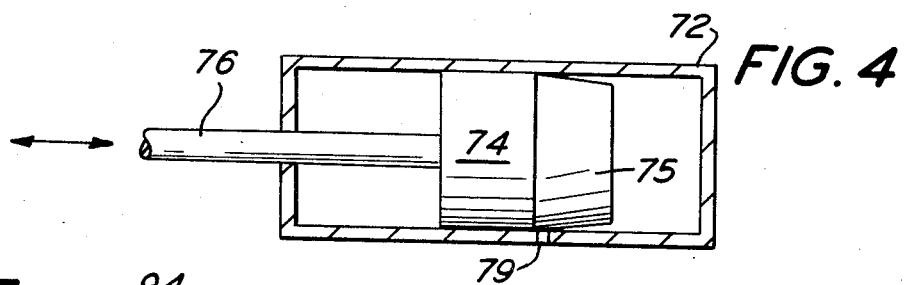
FIG. 4 is a sectional view taken along lines 4—4 of FIG. 3.

The damping means C1 and C2 are identical in construction and are so configured and arranged so that stabilization of image motion is low at low frequencies (½ to 2 Hz) in order to permit panning or scanning while it is high at higher frequencies (40Hz). Also, it is desirable that damping should be minimal about the center of precession and increase exponentially as the precession angle is increased. The damping means C1 comprises a pair of spaced dashpots 70 and 72, the cylinders of which are pivotally supported on the outer gimbal 36. Slidably disposed within each of the cylinders is a piston 74 which has a tapered end portion 75 as shown in FIG. 4. Piston rods 76 are connected to the inner gimbal by way of transverse bar 78, and ball joints 80 permit the pivotal motion of the gimbal to be taken up. Thus, as the tapered head portions 75 of the pistons 74 move past orifice 79 in the cylinders, a lesser degree of leakage occurs through the dashpot. That is, the highest leakage occurs at the center position of the inner gimbal and decreases as the angle from the center increases. Two dampers C1 and C2 are pivotally mounted in pairs on each gyro, as is shown in FIGS. 1 and 3. The angular motion of the inner or pressional axis is thereby transformed into a linear stroke, the inverse non-linear leakage being achieved by the action of the tapered piston 74 passing across the orifice 79 in the corresponding dashpot wall.

The precessional restoring torque means D1 and D2 is applied to the precessional axis of the corresponding gyro B1 or B2, as the case may be, by means of four permanent magnets 82, 84, 86 and 88. Two magnets 82 and 84 are affixed to the outer gimbal (36 or 56) on bracket 90. The two magnets 86 and 88 of like polarity to the magnets 82 and 84, all North in this case, are mounted on transverse bar 78 extending from the inner precessional gimbal to produce a repulsion force between them. Since the repulsion force between the adjacent magnets is inversely proportional to the square of the distance between the magnet faces, the restoring torque characteristics are also minimal about the center of precession and they increase exponentially with increase in precession angle. The net repulsing force due to two pairs of magnets is zero when the wheel assembly is centered, but this force increases exponentially as the angle from center increases. That is, when the spinning wheel assembly is in neutral or center position, it has essentially the characteristics of a free gyro. As the spinning mass precesses away from the neutral position, the exponentially increasing restoring torques cause it to assume the characteristics of a single axis gyro. The proper overall force can be obtained through appropriate selection of magnetic pole strength and initial dimensional placement.

Figure 5:
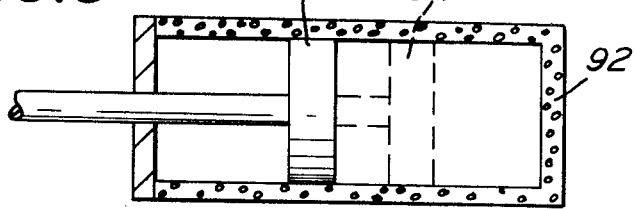
FIG. 5 is a sectional view of a modified form of the damping system illustrated in FIG. 4.

In FIG. 5, there is shown a modification C3 of the damping means wherein inverse leakage is achieved by utilizing a dashpot cylinder 92 which is constructed of a sintered porous material. The air which is compressed within the cylinder 92 by piston 94 leaks through the porous wall. When the position of t the piston 94 is at the top of the cylinder 92, the maximum wall area is open for leakage. However, as the piston travels toward the bottom of the cylinder, the piston itself closes off the wall area so that leakage is progressively decreased with corresponding increase in damping force. With appropriate masking of the exterior cylindrical wall, the desired non-linear damping characteristics can be obtained.

A series of posts 96, 97, 98 and 99 upstand from the frame 23 in order to allow a casing (not shown) to be mounted thereon for conveniently enclosing the system.

As is apparent from the foregoing description, the use of a pair of gyroscopic spinning wheel assemblies B1 and B2 which are coupled mechanically to the respective pivotally supported transparent plates 12 and 14 of the fluid lens A avoids cross-coupling of image motion. The use of the non-linear damping means C1 and C2( or C3) in combination with the magnetic restoring torque means D1 and D2 along the precessional axis yields minimum damping and restoring forces at the center (small image motion correction angles) and exponentially increasing damping and restoring forces where large image motion correction angles are required.

Although this invention has been described in considerable detail, such description is intended as being illustrative rather than limiting, since the invention may be variously embodied without departing from the spirit thereof, and the scope of the invention is to be determined as claimed.

What is claimed is:

1. An image motion compensator for an optical system subject to random angular motion comprising :
   a variable angle fluid wedge including a pair of transparent elements and a fluid medium encapsulated therebetween, said transparent elements being pivotally supported along mutually perpendicular axes in quadrature to the axis of collimation of the optical system,
   first gyro means mechanically coupled to one of said transparent elements for effecting rotation of said one transparent element about the pivotal axis thereof in response to angular motion in a first direction, said first gyro means including means for effecting non-linear damping about the precessional axis thereof, second gyro means mechanically coupled to the other of said transparent elements for effecting rotation of the other of said transparent elements about the pivotal axis thereof in response to angular motion in a second direction having a component normal to said first direction, said second gyro means including means for effecting non-linear damping about an axis of precession orthagonal to the axis of precession of said first gyro means, and means for effecting restoring torque to the axis of precession of each of said gyro means, each of said means for effecting non-linear damping being self-regulating and increasing in damping coefficient with increasing angle of precession.

2. The image motion compensator of claim 1 wherein said means for effecting non-linear damping and said means for effecting restoring torque in each of said gyro means have characteristics which increase exponentially with increasing correctional angles of said variable angle fluid wedge.

3. The image motion compensator of claim 2 wherein said means for effecting non-linear damping in each gyro means comprises a pair of pivotally supported dashpots, and said means for effecting restoring torque in each gyro means constitutes pairs of magnets having opposing poles of the same polarity.

4. The image motion compensator of claim 1 wherein each of said means for effecting non-linear damping comprises a dashpot including a tapered piston.

5. The image motion compensator of claim 1 wherein each of said means for effecting non-linear damping comprises a dashpot including a porous cylindrical wall.

6. The image motion compensator of claim 1 wherein said means for effecting restoring torque comprises magnets.

7. The invention of claim 1 wherein said means for effecting non-linear damping and said means for effecting restoring torque in each of said gyros are so constructed and arranged that when the spinning mass of the gyro is in neutral position characteristics of a free gyro are obtained, and as the spinning mass precesses away from neutral position exponentially increasing restoring torques produce characteristics of a single axis gyro.

* * * * *